(12) United States Patent
Reeder et al.

(10) Patent No.: US 9,621,371 B2
(45) Date of Patent: Apr. 11, 2017

(54) WIRELESS SENSOR DEVICE WITH WIRELESS REMOTE PROGRAMMING

(75) Inventors: Jeffrey M. Reeder, Redmond, WA (US); Robert Thomas, Brier, WA (US); Patrick Brisbine, Sammamish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 1034 days.

(21) Appl. No.: 13/556,971

(22) Filed: Jul. 24, 2012

(65) Prior Publication Data
US 2014/0031988 A1 Jan. 30, 2014

(51) Int. Cl.
*H04L 12/28* (2006.01)

(52) U.S. Cl.
CPC .. *H04L 12/2816* (2013.01); *H04L 2012/2841* (2013.01)

(58) Field of Classification Search
CPC .................... H04L 2012/2841; H04L 12/2816
USPC ................................................. 700/297, 276
See application file for complete search history.

(56) References Cited

U.S. PATENT DOCUMENTS

| | | |
|---|---|---|
| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,549,169 A | 10/1985 | Moura et al. |
| 4,550,312 A | 10/1985 | Galloway et al. |
| 4,614,945 A | 9/1986 | Brunius et al. |
| 4,812,785 A | 3/1989 | Pauker |
| 4,843,638 A | 6/1989 | Walters |
| 4,868,795 A | 9/1989 | Mcdavid et al. |
| 4,918,425 A | 4/1990 | Greenberg et al. |

(Continued)

FOREIGN PATENT DOCUMENTS

| | | |
|---|---|---|
| CH | 673184 | 2/1990 |
| DE | 352917 | 2/1987 |

(Continued)

OTHER PUBLICATIONS

"Image Rejection in Mixers," copyright AAA, 1996.

(Continued)

*Primary Examiner* — Robert Fennema
*Assistant Examiner* — Jigneshkumar Patel
(74) *Attorney, Agent, or Firm* — Seager, Tufte & Wickhem, LLP

(57) ABSTRACT

The disclosure relates generally to wireless sensor devices, and more particularly, to remote programming of wireless sensor devices. A wireless sensor device wirelessly may receive messages from a remotely located device to a wireless sensor device. The wireless sensor device may be programmed via the receive messages. In one example, a building controller may be programmed to wirelessly send one or more messages to a wireless sensor device in order to change the behavior of the wireless sensor device, even while the wireless sensor device and building controller are on-line and actively controlling a building control system. In some instances, a technician or installer may use a diagnostic or setup tool to send one or more messages to a wireless sensor device to change the behavior of the wireless sensor device. These are just some examples.

6 Claims, 1 Drawing Sheet

(56) References Cited

U.S. PATENT DOCUMENTS

| | | | |
|---|---|---|---|
| 4,933,668 A | 6/1990 | Oyer et al. | |
| 4,968,966 A | 11/1990 | Jasinski et al. | |
| 5,003,619 A | 3/1991 | Morris et al. | |
| 5,063,371 A | 11/1991 | Oyer et al. | |
| 5,097,671 A | 3/1992 | Jeong-Hun | |
| 5,287,109 A | 2/1994 | Hesse | |
| 5,322,034 A | 6/1994 | Willham et al. | |
| 5,382,948 A | 1/1995 | Richmond | |
| 5,390,206 A | 2/1995 | Rein et al. | |
| 5,392,003 A | 2/1995 | Nag et al. | |
| 5,395,042 A | 3/1995 | Riley et al. | |
| 5,428,388 A | 6/1995 | Von Bauer et al. | |
| 5,428,602 A | 6/1995 | Kemppainen | |
| 5,428,637 A | 6/1995 | Oliva, Jr. et al. | |
| 5,430,409 A | 7/1995 | Buck et al. | |
| 5,438,329 A | 8/1995 | Gastouniotis et al. | |
| 5,451,898 A | 9/1995 | Johnson | |
| 5,465,399 A | 11/1995 | Oberholtzer et al. | |
| 5,481,259 A | 1/1996 | Bane | |
| 5,544,036 A * | 8/1996 | Brown et al. | 340/12.52 |
| 5,594,447 A | 1/1997 | Usui et al. | |
| 5,595,342 A | 1/1997 | McNair et al. | |
| 5,613,228 A | 3/1997 | Tuttle et al. | |
| 5,642,071 A | 6/1997 | Sevenhans et al. | |
| 5,659,303 A | 8/1997 | Adair, Jr. | |
| 5,663,774 A | 9/1997 | Baik | |
| 5,726,603 A | 3/1998 | Chawla et al. | |
| 5,745,049 A | 4/1998 | Akiyama et al. | |
| 5,745,849 A | 4/1998 | Britton | |
| 5,767,664 A | 6/1998 | Price | |
| 5,767,791 A | 6/1998 | Stoop et al. | |
| 5,782,036 A | 7/1998 | Bertieri et al. | |
| 5,809,013 A | 9/1998 | Kackman | |
| 5,822,544 A | 10/1998 | Chaco et al. | |
| 5,825,327 A | 10/1998 | Krasner | |
| 5,847,623 A | 12/1998 | Hadjichristos | |
| 5,867,763 A | 2/1999 | Dean et al. | |
| 5,905,442 A | 5/1999 | Mosebrook et al. | |
| 5,963,650 A | 10/1999 | Simionescu et al. | |
| 5,973,613 A | 10/1999 | Reis et al. | |
| 6,034,603 A | 3/2000 | Steeves | |
| 6,052,600 A | 4/2000 | Fette et al. | |
| 6,058,137 A | 5/2000 | Partyka | |
| 6,075,513 A | 6/2000 | Reddy et al. | |
| 6,084,530 A | 7/2000 | Pidwerbetsky et al. | |
| 6,087,930 A | 7/2000 | Kulka et al. | |
| 6,091,715 A | 7/2000 | Vucetic et al. | |
| 6,175,860 B1 | 1/2001 | Gaucher | |
| 6,198,394 B1 | 3/2001 | Jacobsen et al. | |
| 6,259,399 B1 | 7/2001 | Krasner | |
| 6,275,166 B1 | 8/2001 | del Castillo et al. | |
| 6,353,846 B1 | 3/2002 | Fleeson | |
| 6,366,572 B1 | 4/2002 | Esterberg et al. | |
| 6,366,622 B1 | 4/2002 | Brown et al. | |
| 6,414,963 B1 | 7/2002 | Gemar | |
| 6,624,750 B1 | 9/2003 | Marman et al. | |
| 6,631,271 B1 | 10/2003 | Logan | |
| 6,727,816 B1 | 4/2004 | Helgeson | |
| 6,768,901 B1 | 7/2004 | Osborn et al. | |
| 6,785,255 B2 | 8/2004 | Sastri et al. | |
| 6,788,271 B1 | 9/2004 | Koo et al. | |
| 6,823,181 B1 | 11/2004 | Kohno et al. | |
| 6,836,506 B2 | 12/2004 | Anderson | |
| 6,901,066 B1 | 5/2005 | Helgeson | |
| 6,931,078 B2 | 8/2005 | Mccorkle et al. | |
| 6,987,793 B2 | 1/2006 | Dhar et al. | |
| 6,996,402 B2 | 2/2006 | Logan et al. | |
| 7,002,910 B2 | 2/2006 | Garcia-luna-aceves et al. | |
| 7,015,789 B1 | 3/2006 | Helgeson | |
| 7,184,524 B2 | 2/2007 | Digate et al. | |
| 7,298,716 B2 | 11/2007 | Abraham et al. | |
| 7,394,782 B2 | 7/2008 | Davis | |
| 7,412,265 B2 | 8/2008 | Chen et al. | |
| 7,446,647 B2 | 11/2008 | Helgeson | |
| 7,450,926 B2 | 11/2008 | Chang et al. | |
| 7,471,942 B2 | 12/2008 | Subramanian et al. | |
| 7,620,409 B2 | 11/2009 | Budampati et al. | |
| 7,636,042 B2 | 12/2009 | Hameed et al. | |
| 7,684,408 B2 | 3/2010 | Wakabayashi | |
| 7,689,843 B2 | 3/2010 | Hassan et al. | |
| 8,139,623 B2 | 3/2012 | Nielsen et al. | |
| 2002/0011923 A1 | 1/2002 | Cunningham et al. | |
| 2002/0146985 A1 | 10/2002 | Naden | |
| 2003/0086393 A1 | 5/2003 | Vasudevan et al. | |
| 2003/0198280 A1 | 10/2003 | Wang et al. | |
| 2006/0056322 A1 | 3/2006 | Simpson et al. | |
| 2007/0037610 A1 | 2/2007 | Logan | |
| 2007/0207841 A1 | 9/2007 | Amerga et al. | |
| 2010/0106319 A1* | 4/2010 | Grohman et al. | 700/276 |
| 2010/0287559 A1 | 11/2010 | Mergen et al. | |
| 2011/0066297 A1* | 3/2011 | Saberi et al. | 700/287 |
| 2011/0137614 A1 | 6/2011 | Wheeler | |
| 2011/0264280 A1* | 10/2011 | Grabinger et al. | 700/282 |
| 2012/0033584 A1 | 2/2012 | Corroy | |

FOREIGN PATENT DOCUMENTS

| | | |
|---|---|---|
| DE | 19548650 | 6/1997 |
| DE | 4344172 | 10/2006 |
| EP | 0565507 | 10/1993 |
| EP | 0574230 | 12/1993 |
| EP | 0607562 | 7/1994 |
| EP | 0893931 | 1/1999 |
| FR | 2592977 | 7/1987 |
| GB | 2273593 | 6/1994 |
| WO | WO 9307702 | 4/1993 |
| WO | WO 9818225 | 4/1998 |
| WO | WO 0070572 | 11/2000 |

OTHER PUBLICATIONS

"Medium Access Control (MAC) and Physical (PHY) Specifications," ANSI/IEEE Std 802.11, pp. 177-179, 1999.

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE INFOCOM 2004, 12 pages, 2004.

Chiasserini et al., "An Analytical Model for Wireless Sensor Networks with Sleeping Nodes," IEEE Transactions on Mobile Computing, vol. 5, No. 12, pp. 1706-1718, Dec. 2006.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bamboweb.com/articles/o/s/OSI_model.html, "Bambooweb OSI model," Bambooweb Dictionary, 5 pages, printed May 23, 2005.

http://www.dailywireless.org/modules.php?name=News &file=article&sid=871, "Location by Triangulation—Not," Daily Wireless, 2 pages, printed May 2, 2005.

http://www.unstrung.com/document.asp?site=unstrung&doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

(56) References Cited

OTHER PUBLICATIONS

Kinney, "ZigBee Technology: Wireless Control That Simply Works," 20 pages, Oct. 2, 2003.
Lee, "The Design of CMOS Radio-Frequency Integrated Circuits," Cambridge University Press, 42 pages, 1998.
Milstein, "Wideband Code Division Multiple Access," IEEE Journal on Selected Areas in Communications, vol. 18, No. 8, pp. 1344-1354, Aug. 2000.
Nasipuri et al., "A Directionality Based Location Discovery Scheme for Wireless Sensor Networks," pp. 105-111, prior to Jun. 17, 2005.
Razavi, "Design Considerations for Direct-Conversion Receivers," IEEE Transactions on Circuits and Systems—II: Analog and Digital Signal Processing, vol. 44, No. 6, pp. 428-435, Jun. 1997.
Rofougaran et al., "A 1 GHz CMOS RF Front-End IC for a Direct-Conversion Wireless Receiver," IEEE Journal of Solid-State Circuits, vol. 31, pp. 880-889, Jul. 1996.
Rofougaran et al., "A 900 MHz CMOS RF Power Amplifier with Programmable Output Power," Proceedings VLSI Circuits Symposium, Honolulu, 4 pages, Jun. 1994.
Savvides et al., "Dynamic Fine-Grained Localization in Ad-Hoc Networks of Sensors," pp. 166-179, prior to Jun. 17, 2005.
Want et al. "The Active Badge Location System," 7 pages, prior to Jun. 17, 2005.
Wilson et al., "A Single-Chip VHF and UHF Receiver for Radio Paging", IEEE Journal of Solid State Circuits, vol. 26, No. 12, 9 pp. 1944-1950, Dec. 1991.

\* cited by examiner

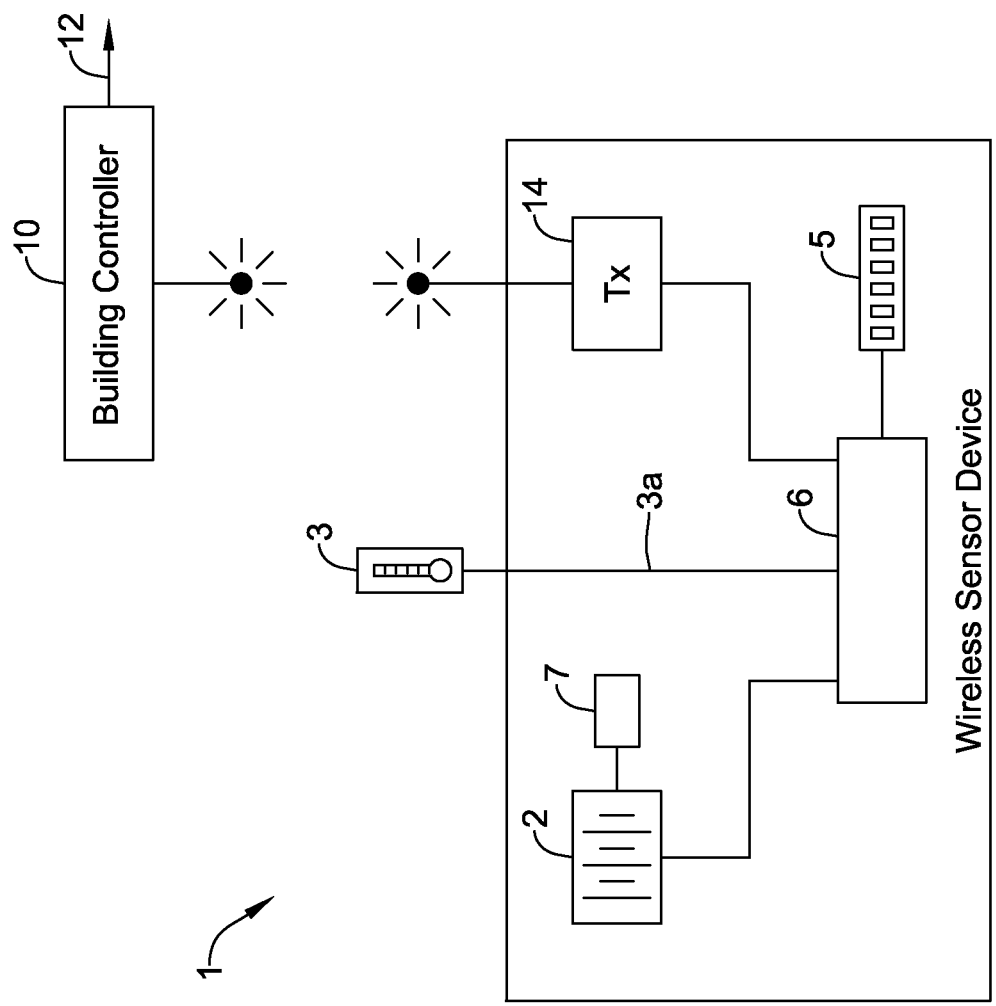

WIRELESS SENSOR DEVICE WITH WIRELESS REMOTE PROGRAMMING

TECHNICAL FIELD

The disclosure relates generally to wireless sensor devices, and more particularly, to remote programming of wireless sensor devices.

BACKGROUND

Wireless sensor devices are often used in control applications such as building control applications. Such wireless sensor devices often include a sensor for sensing a condition in the building. The wireless sensor device may wirelessly transmit the sensed condition to a remotely located controller, such as a remotely located building controller. When so provided, the remotely located building controller may use the sensed condition to control a building system, such as an HVAC system, a security system, a fire detection system, or any other system.

SUMMARY

The disclosure relates generally to wireless sensor devices, and more particularly, to remote programming of wireless sensor devices. In some cases, it may be desirable to wirelessly program a wireless sensor device from a remote location. For example, in some instances, a building controller may wirelessly send one or more messages to a wireless sensor device in order to change the behavior of the wireless sensor device, even while the wireless sensor device and building controller are on-line and actively controlling a building control system. In some instances, a technician or installer may use a diagnostic or setup tool to send one or more messages to a wireless sensor device to change the behavior of the wireless sensor device. These are just some examples.

In one illustrative embodiment, a building controller may be programmed to wirelessly send one or more messages to a wireless sensor device in order to change a sleep algorithm used by the wireless sensor device. In one example, a battery-powered wireless sensor device includes a battery for providing power to the wireless sensor device, a sensor for sensing one or more conditions in or around the wireless sensor device, a wireless transceiver for wirelessly sending and receiving messages to/from a remotely located device such as a remotely located building control device, a memory for storing one or more parameter values and a controller in communication with the battery, the sensor, the wireless transceiver and the memory.

In some instances, the controller may be configured to: switch the wireless sensor device between a lower power sleep mode and a higher power awake mode, wherein in the lower power sleep mode, the wireless sensor device does not send or receive messages to/from the remotely located device via the wireless transceiver; receive one or more messages from the remotely located device via the transceiver of the wireless sensor device, wherein the one or more messages specify a sleep algorithm to be used by the controller to determine when to switch the wireless sensor device between the lower power sleep mode and the higher power awake mode; and subsequently switch between the lower power sleep mode and the higher power awake mode in accordance with the sleep algorithm specified by the one or more messages from the remotely located device.

Alternatively, or in addition, the controller of the wireless sensor device may be configured to: receive one or more parameter setting messages from the remotely located device via the transceiver in the higher power awake mode, wherein the one or more parameter setting messages provide one or more parameter values, the one or more parameter values stored into the memory; and determine when to switch between the lower power sleep mode and the higher power awake mode based on one or more sleep algorithms, wherein at least one of the one or more sleep algorithms is dependent upon one or more of the parameter values received from the remotely located device and stored in the memory.

Alternatively, or in addition, the controller of the wireless sensor device may be configured to: receive one or more messages from a remotely located device via the transceiver, wherein the one or more messages specify one or more rules for operating the wireless sensor device; and operate the wireless sensor device in accordance with the one or more rules. In some cases, the one or more rules may define, at least in part, a sleep algorithm that is used to determine when to switch the wireless sensor device between the lower power sleep mode and the higher power awake mode. Alternatively, or in addition, the one or more rules may define how long to wait for an acknowledgement during communication with the remotely located device, how often to transmit the sensed condition, sometimes depending on the condition of the battery. These are just some examples.

While wireless sensor devices are used as one example, it is contemplated that the principles disclosed herein may be applied to wireless building controllers such as wireless thermostats, wireless zone controllers, wireless equipment interface modules, wireless security system controllers, wireless building control actuators such as wireless damper and valve actuators, and any other suitable wireless building control device, as desired.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following description of various embodiments in connection with the accompanying drawing, in which:

FIG. 1 is a schematic view of an illustrative but non-limiting wireless sensor device having a controller in wireless communication with a remotely located device.

While the disclosure is amenable to various modifications and alternative forms, specifics thereof have been shown by way of example in the drawing and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawing. The description and drawing are meant to illustrative in nature. While a battery powered wireless sensor device is used as an example below, it is contemplated that the present disclosure can be applied to any suitable device, as desired. For instance, the disclosure may be applied to devices that are powered by a wall current or are plugged into other devices for power, rather than just battery powered. As another example, the disclosure may be applied to devices that control other devices, such as general purpose input/output (GPIO), rather than just sensor devices. In some cases, the disclosure may be applied to wireless building controllers such as wireless thermostats, wireless zone controllers, wireless equipment interface modules, wireless security system controllers, wireless building control actuators such as wireless damper and valve actuators, and/or any other suitable wireless building control device, as desired.

FIG. 1 is a schematic view of an illustrative but non-limiting wireless sensor device 1 in wireless communication with a remotely located device 10. In the example shown, the wireless sensor device 1 may operate on battery power and, as such, may implement various algorithms to help conserve battery power when possible. The wireless sensor device 1 may include a sensor 3, such as a temperature sensor, a humidity sensor, a pressure sensor, a flow sensor, a motion sensor, an acoustical sensor, a magnetic sensor, a contact sensor, a light sensor, and/or any other suitable sensor. The wireless sensor device 1 may sense an ambient condition (e.g. temperature, humidity, etc.) in or around the wireless sensor device 1. The wireless sensor device 1 may include a wireless transceiver 14 for wirelessly sending and receiving messages to/from a remotely located device 10, such as a remotely located building controller. In some instances, the remotely located device 10 may be a diagnostic or setup tool that may be used by a technician or installer to send one or more messages to the wireless sensor device 1.

In one example, the remotely located device 10 may be a building controller. The wireless sensor device 1 may send messages to the building controller that includes a measure related to the condition sensed by the sensor 3 of the wireless sensor device 1. The building controller may use the measure related to the sensed condition to determine and then send one or more control signals 12 to a building control system (not shown). In some instances, the building control system may be, for example, an HVAC system, a security system, a fire detection system, and/or any other suitable building control system as desired.

In the example shown in FIG. 1, the wireless sensor device 1 may include a battery 2, which may be rechargeable or replaceable. In general, it is desirable to lengthen the time between recharging or replacement of the battery 2. The wireless sensor device 1 also includes a sensor 3 that senses one or more conditions in or around the wireless sensor device 1, a wireless transceiver 14 for wirelessly sending and receiving messages to and/or from the remotely located device 10, and a memory 5 for storing one or more parameter values.

The illustrative wireless sensor device 1 of FIG. 1 also includes a controller 6. The controller 6 communicates with the battery 2, the sensor 3, the wireless transceiver 14 and the memory 5. With regard to the battery 2, the controller 6 may received power from, and in some cases, monitor the current flowing from the battery 2 and/or the voltage provided by the battery 2. In some cases, the controller 6 may determine an amount of life left in the battery 2. In some instances, the controller 6 may be programmed to operate differently depending on the amount of life left in the battery 2. For example, the controller may increase the time between when the sensed condition is transmitted to the remotely located device 10 after the amount of life left in the battery 2 falls below a threshold value. With regard to the sensor 3, the controller 6 may poll the sensor 3 at a particular time and may receive a reading from the sensor 3 in response. With regard to the wireless transceiver 14, the controller 6 may receive and interpret messages that arrive through the wireless transceiver 14, and may compose and transmit messages through the wireless transceiver 14. With regard to the memory 5, the controller 6 may store and retrieve particular parameter values, algorithms, and other data as needed.

In some cases, the controller 6 may be configured to switch the wireless sensor device 1 between a lower power sleep mode and a higher power awake mode. In the lower power sleep mode, the wireless sensor device 1 may not send or receive messages to/from the remotely located device 10 via the wireless transceiver 14. In the higher power awake mode, the controller 6 may be configured to send and/or receive one or more messages to/from the remotely located device 10 via the wireless transceiver 14. In some instances, the "lower power sleep mode" and the "higher power awake mode" discussed herein may be thought of as being a "quiet" mode and a "talking" mode, respectively, where being "quiet" can have the potential advantages of saving power, preserving wireless and/or wired channel capacity, and/or preventing unneeded processing of data.

In some instances, the one or more messages from the remotely located device 10 may specify a sleep algorithm that is to be used by the controller 6 to determine when to switch the wireless sensor device 1 between the lower power sleep mode and the higher power awake mode during subsequent operation of the wireless sensor device 1. The controller 6 may be configured to subsequently switch between the lower power sleep mode and the higher power awake mode in accordance with the sleep algorithm specified by the one or more messages from the remotely located device 10.

In some cases, the sensor 3 may provide a sensor signal 3a that encodes a measure related to the sensed condition in or around the wireless sensor device 1. In some cases, the sleep algorithm may use, at least in part, the sensor signal 3a to determine when to switch the wireless sensor device 1 between the lower power sleep mode and the higher power awake mode. Alternatively, or in addition, the sleep algorithm may use a measure related to a rate of change of the sensor signal 3a to determine when to switch the wireless sensor device 1 between the lower power sleep mode and the higher power awake mode. The one or more messages may identify a desired sleep algorithm. It is contemplated that the sleep mode may be communicated and switched even while the wireless sensor device 1 and building controller 10 are on-line and actively controlling a building control system.

In some cases, the wireless sensor device 1 may include a battery condition monitor 7 that provides a measure related to the current charge condition of the battery 2. In some cases, the sleep algorithm may use, at least in part, a measure related to the current charge condition of the battery 2 to determine when to switch the wireless sensor device between the lower power sleep mode and the higher power awake mode. In some instances, the sleep algorithm may increase the time the wireless sensor device 1 is in the lower power sleep mode relative to the higher power awake mode as the condition of the battery 2 deteriorates over time and/or crosses a threshold value.

In some cases, the controller 6, through the transceiver 4, may establish communication with the remotely located device 10 via a wireless link and/or wireless network. In some cases, the sleep algorithm may keep the wireless sensor device 1 in the higher power awake mode until the controller 6 establishes communication with the remotely located device 10 via the wireless link or wireless network.

In some instances, the controller 6 may be configured to receive one or more parameter setting messages from the remotely located device 10 via the wireless transceiver 14 in the higher power awake mode. The one or more parameter setting messages may provide one or more parameter values, which may be stored in memory 5. In some cases, the controller 6 may determine when to switch between the lower power sleep mode and the higher power awake mode based on one or more sleep algorithms that read up or otherwise are dependent upon one or more of the parameter values. For example, and in some instances, at least one of the one or more sleep algorithms uses a sleep interval that corresponds to a sleep time between each of two or more successive higher power awake modes. In some cases, at least one of the parameter values of the parameter setting messages may correspond to the sleep interval. In another example, at least one of the one or more sleep algorithms may use a sleep interval for a set number of sleep periods. The parameter values of the parameter setting messages may set one or both of the sleep interval (e.g. 10 seconds) or the number of sleep periods (28800 sleep periods, which would set the sleep interval to be 10 seconds for the next 8 hours). New parameter values may be sent via one or more subsequent parameter setting messages to set a different sleep interval and/or a different period of time, as desired.

In some cases, the remotely located device 10 may be a building controller (e.g. HVAC Controller) that stores and executes a programmable schedule such as a programmable temperature schedule. The temperature schedule may include a more energy efficient set point during a scheduled unoccupied time period and a less energy efficient set point during a scheduled occupied time period. The HVAC controller may send one or more first parameter setting messages to the wireless sensor device 1 that specify a first sleep interval in response to entering an unoccupied time period of the schedule, and may send one or more second parameter setting messages that specify a second sleep interval in response to entering a subsequent occupied time period of the schedule, even while the wireless sensor device 1 and the HVAC controller are on-line and actively controlling a building control system (e.g. HVAC system).

In some cases, the controller 6 of the wireless sensor device 1 may include a rules based engine that controls the operation of at least part of the wireless sensor device 1 according to a number of rules. When so provided, the wireless sensor device 1 may receive one or more messages from the remotely located device 10 via the wireless transceiver 14 that specify one or more rules. The rules may be stored in the memory 5. The rules based engine of the controller 6 may read up the rules from the memory 5 and control the operation of at least part of the wireless sensor device 1 according to the received rules. In some cases, the one or more rules may define, at least in part, a sleep algorithm that is used to determine when to switch the wireless sensor device 1 between the lower power sleep mode and the higher power awake mode. In some cases, the transceiver 4 communicates with the remotely located device via a wireless network that includes a communication protocol that requires an acknowledgement to acknowledge a communication across the wireless network. The one or more rules may define how long to wait for an acknowledgement. In some cases, the controller 6 is configured to transmit a measure related to the one or more sensed conditions via the wireless transceiver 14. The one or more rules may define, at least in part, how often to transmit the measure. In some cases, the wireless sensor device 1 may include a battery condition monitor 7 that provides a measure related to the current charge condition of the battery 2. The one or more rules may define, at least in part, how often to transmit the measure based on the current charge condition of the battery 2. Use of a rules based engine may simplify the definition, transmission and subsequent programming of the wireless sensor device 1.

An illustrative method for operating a wireless sensor device 1 may include wirelessly receiving one or more first messages from the remotely located device 10 via the wireless transceiver 14, wherein the one or more first messages may specify a first sleep algorithm that is used by the controller 6 to determine when to switch the wireless sensor device 1 between the lower power sleep mode and the higher power awake mode. The method may then execute the first sleep algorithm specified by the one or more first messages from the remotely located device 10 until one or more subsequent second messages are received from the remotely located device 10 that specify a second sleep algorithm, whereupon, the second sleep algorithm specified by the one or more subsequent second messages may be executed in place of the first sleep algorithm.

In some cases, after receiving the one or more second messages, the wireless sensor device 1 may wirelessly receive one or more third messages from the remotely located device 10 via the wireless transceiver 14. The one or more third messages may specify a third sleep algorithm that is used by the controller 6 to determine when to switch the wireless sensor device between the lower power sleep mode and the higher power awake mode. The controller may then execute the third sleep algorithm specified by the one or more third messages from the remotely located device 10 in place of the second sleep algorithm. In some cases, the first sleep algorithm allows more sleep time than the second sleep algorithm.

Having thus described several illustrative embodiments of the present disclosure, those of skill in the art will readily appreciate that yet other embodiments may be made and used within the scope of the claims hereto attached. It will be understood, however, that this disclosure is, in many respect, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A battery-powered wireless sensor device, comprising:
   a battery for providing power to the wireless sensor device;
   a sensor for sensing one or more conditions in or around the wireless sensor device;
   a wireless transceiver for wirelessly sending and receiving messages to/from a remotely located device;
   a memory for storing one or more parameter values;
   a controller in communication with the battery, the sensor, the wireless transceiver and the memory, the controller configured to:
   switch the wireless sensor device between a lower power sleep mode and a higher power awake mode, wherein in the lower power sleep mode, the wireless sensor device does not send or receive messages to/from the remotely located device via the wireless transceiver;

receive one or more messages from the remotely located device via the transceiver, wherein the one or more messages specify a sleep algorithm to be used by the controller to determine when to switch the wireless sensor device between the lower power sleep mode and the higher power awake mode; and subsequently switch between the lower power sleep mode and the higher power awake mode in accordance with the sleep algorithm specified by the one or more messages from the remotely located device;

wherein the sensor is configured to provide a sensor signal, and wherein the sleep algorithm is configured to use a measure related to a rate of change of the sensor signal to determine when to switch the wireless sensor device between the lower power sleep mode and the higher power awake mode.

2. The battery-powered wireless sensor device of claim 1, further comprising a battery condition monitor configured to provide a measure related to the current condition of the battery, wherein the sleep algorithm is configured to use, at least in part, the measure related to the current condition of the battery to determine when to switch the wireless sensor device between the lower power sleep mode and the higher power awake mode.

3. The battery-powered wireless sensor device of claim 2, wherein the sleep algorithm is configured to increase the sleep time in response to deterioration of the condition of the battery over time.

4. The battery-powered wireless sensor device of claim 1, wherein the controller, through the transceiver, is configured to establish communication with a network, and wherein the sleep algorithm is configured to keep the wireless sensor device in the higher power awake mode during establishment of communication with the network by the controller and transceiver.

5. A wireless controller for controlling a building control actuator, comprising:
   a wireless transceiver for wirelessly sending and receiving messages to/from a remotely located device;
   a controller for issuing commands to one or more actuators of a building control system, the controller coupled to the wireless transceiver and configured to:
   switch the wireless building controller unit between a lower power sleep mode and a higher power awake mode, wherein in the lower power sleep mode, the wireless building controller unit does not send or receive messages to/from the remotely located device via the wireless transceiver;
   receive one or more messages from the remotely located device via the wireless transceiver, wherein the one or more messages specify a sleep algorithm to be used by the wireless controller to determine when to switch the wireless controller between the lower power sleep mode and the higher power awake mode; and
   subsequently switch between the lower power sleep mode and the higher power awake mode in accordance with the sleep algorithm specified by the one or more messages from the remotely located device;
   further comprising a sensor for sensing a condition and providing an output sensor signal, wherein the sleep algorithm is configured to use a measure related to a rate of change of the sensor signal to determine when to switch the wireless controller between the lower power sleep mode and the higher power awake mode.

6. The wireless controller of claim 5, wherein the wireless controller is configured to control a damper actuator and/or a valve actuator.

* * * * *